United States Patent [19]
Chuang

[11] Patent Number: 5,908,147
[45] Date of Patent: *Jun. 1, 1999

[54] CARRYING BAG FOR A NOTEBOOK COMPUTER AND PERIPHERALS

[76] Inventor: Yao Tang Chuang, P.O. Box 82144, Taipei, Taiwan

[*] Notice: This patent is subject to a terminal disclaimer.

[21] Appl. No.: 08/902,520

[22] Filed: Jul. 29, 1997

[51] Int. Cl.⁶ ................................................ A45C 3/02
[52] U.S. Cl. .................... 224/607; 190/11; 190/100; 224/577; 224/644; 224/655
[58] Field of Search ........................... 224/607, 644, 224/657, 654, 655, 929, 575, 577; 361/680, 683; D3/319, 900; 190/125, 102, 127, 11, 100

[56] References Cited

U.S. PATENT DOCUMENTS

| | | | |
|---|---|---|---|
| 2,574,089 | 11/1951 | Cochran | 190/125 |
| 3,112,017 | 11/1963 | Lifton | 190/11 |
| 4,796,735 | 1/1989 | Horiuchi | 190/127 X |
| 5,639,004 | 6/1997 | Carlton et al. | 224/644 |

*Primary Examiner*—Renee S. Luebke
*Attorney, Agent, or Firm*—A & J

[57] ABSTRACT

A carrying bag for a notebook computer and peripherals includes a rectangular case provided with with a cover having one side connected with one side of the rectangular case and three sides sealably connected with the rectangular case by a zipper, the rectangular case having a rigid frame around inner vertical sides thereof, the rigid frame being slightly lower than upper edges of the rectangular case, a pair of supporting straps connected between the rectagular case and the cover, each of the supporting straps having an inner side provided with a seam at an intermediate portion thereof, and a rigid board dimensioned to fit on a top of the rigid frame, whereby one may to use a notebook computer and necessary peripherals conveniently no matter where he is.

4 Claims, 8 Drawing Sheets

CARRYING BAG FOR A NOTEBOOK COMPUTER AND PERIPHERALS

BACKGROUND OF THE INVENTION

1. Field of the Invention

This invention is related to a carrying bag for a computer and peripherals and in particular to one which can keep a computer in a firm working position.

2. Description of the Prior Art

Conventionally, one uses a bag to carry a notebook computer together with necessary peripherals such as, for example, adaptor, modem, mouse, and the like. However, such a bag is simply made of cloth or synthetic material and the notebook computer therein will not have any effective protection when colliding with other objects. Furthermore, the side walls of the bag are higher than the top of the notebook computer so that when the user operates the keyboard of the notebook computer, he must lift his wrist in order to prevent interfering with the side walls of the bag thereby making him easily fatigued. In addition, the floppy disk drive, CD-Rom, power socket, PC card slot and zip drive are arranged on the vertical sides of the notebook computer, the operation of these devices would interfere with the side walls of the bag thus causing much inconvenience in use. Furthermore, if an user put the notebook computer on his lap top for operation, it will easily slip off his lap top and fall down on the floor.

Therefore, it is an object of the present invention to provide an improved carrying bag for a notebook computer and peripherals which can obviate and mitigate the above-mentioned drawbacks.

SUMMARY OF THE INVENTION

This invention is related to an improved carrying bag for a notebook computer and peripherals.

It is the primary object of the present invention to provide a carrying bag for a notebook computer and necessary peripherals which enables one to use a notebook computer and necessary peripherals conveniently no matter where he is.

It is another object of the present invention to provide a carrying bag for a notebook computer and necessary peripherals which can effectively prevent the notebook computer from being damaged when colliding with other objects.

It is still another object of the present invention to provide a carrying bag for a notebook computer which enables one to operate a notebook computer without worrying that it would slip off his lap top.

It is still another object of the present invention to provide a carrying bag for a notebook computer and necessary peripherals which is fit for practical use.

It is still another object of the present invention to provide a carrying bag for a notebook computer and necessary peripherals which is easy to manufacture.

It is a further object of the present invention to provide a carrying bag for a notebook computer and necessary peripherals which is simple in construction.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
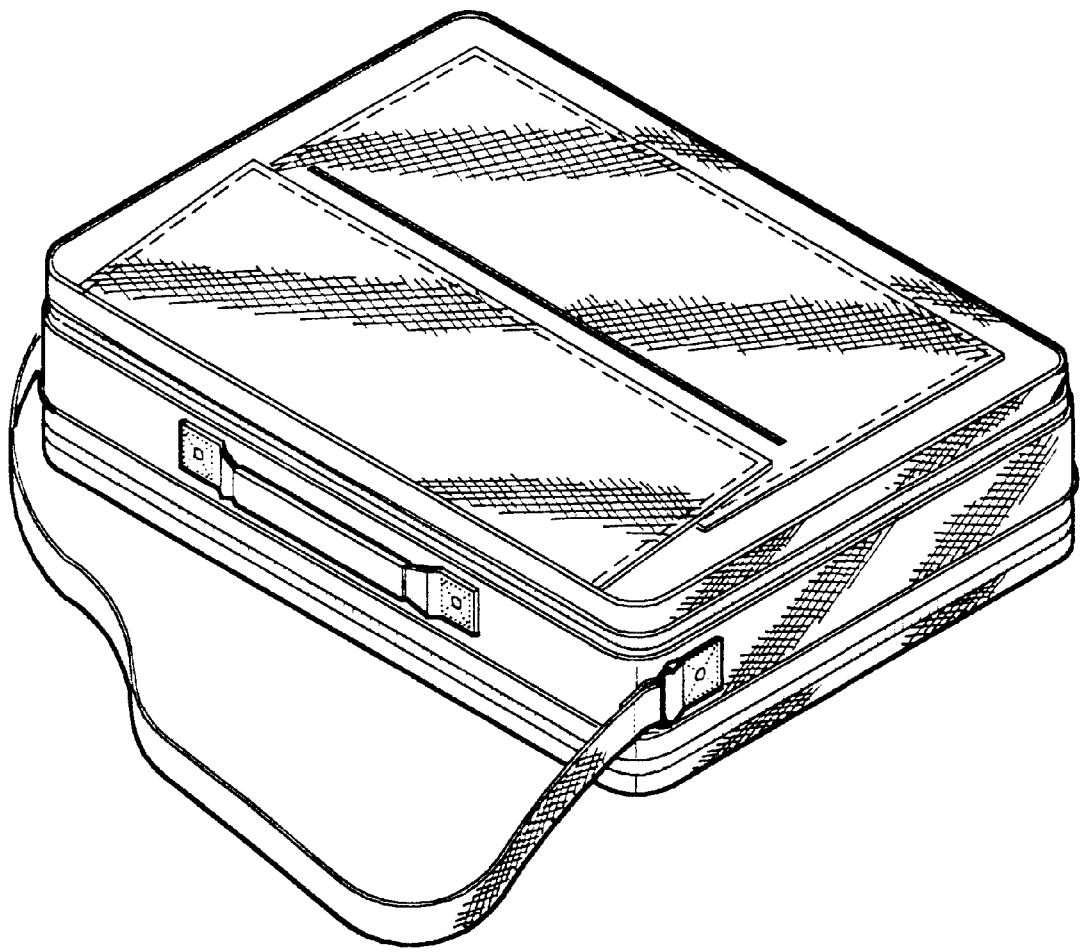
FIG. 1 is a perspective view of the present invention.
Figure 2:
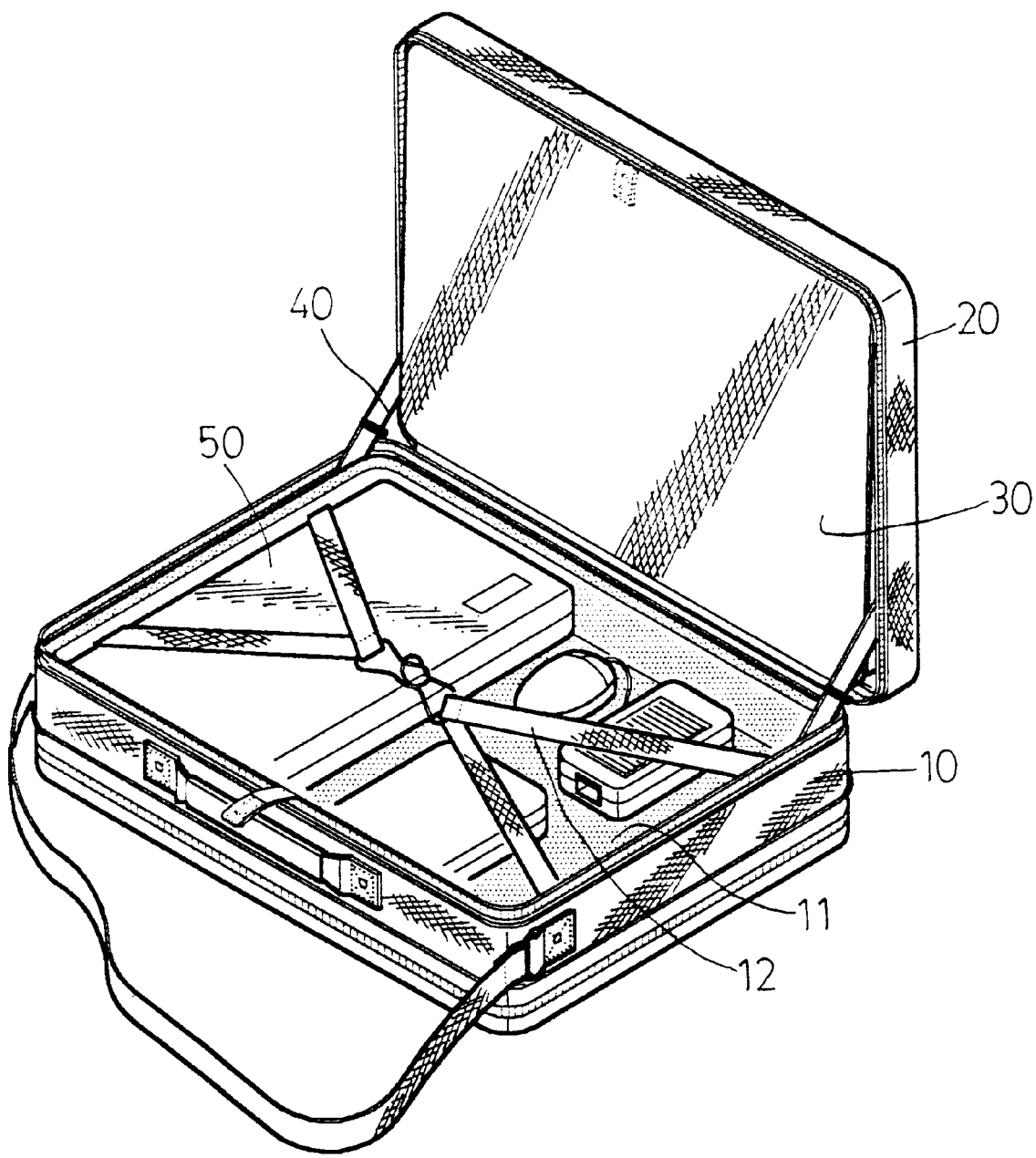
FIG. 2 is a perspective view of the present invention shown in an open condition.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 2, 3, 3A, 4 and 5, the carrying bag for a notebook computer and peripherals according to the present invention generally comprises a rectangular case 10 and a rigid board 30.

Figure 6:
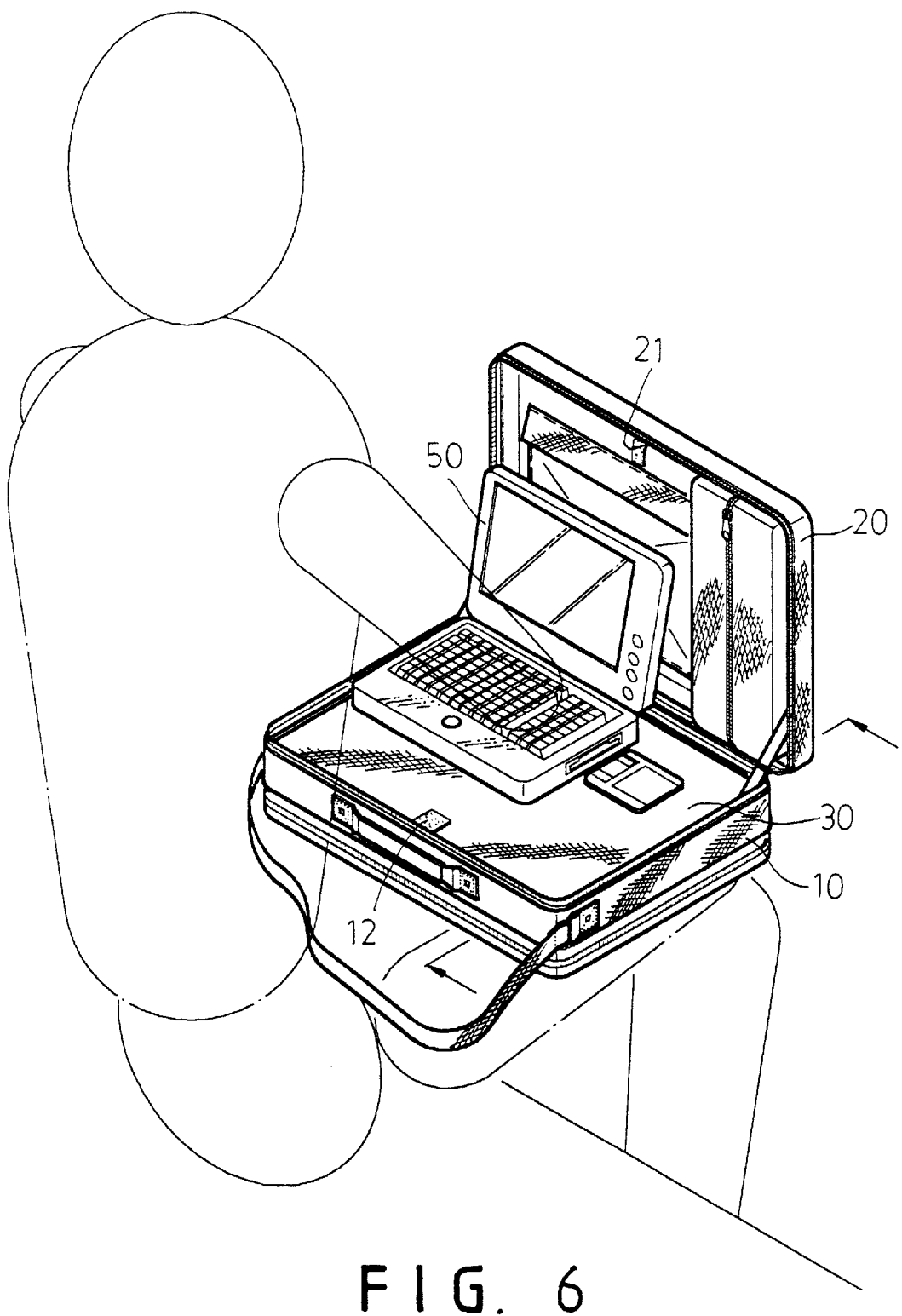
FIG. 6 is a working view of the present invention.
Figure 7:
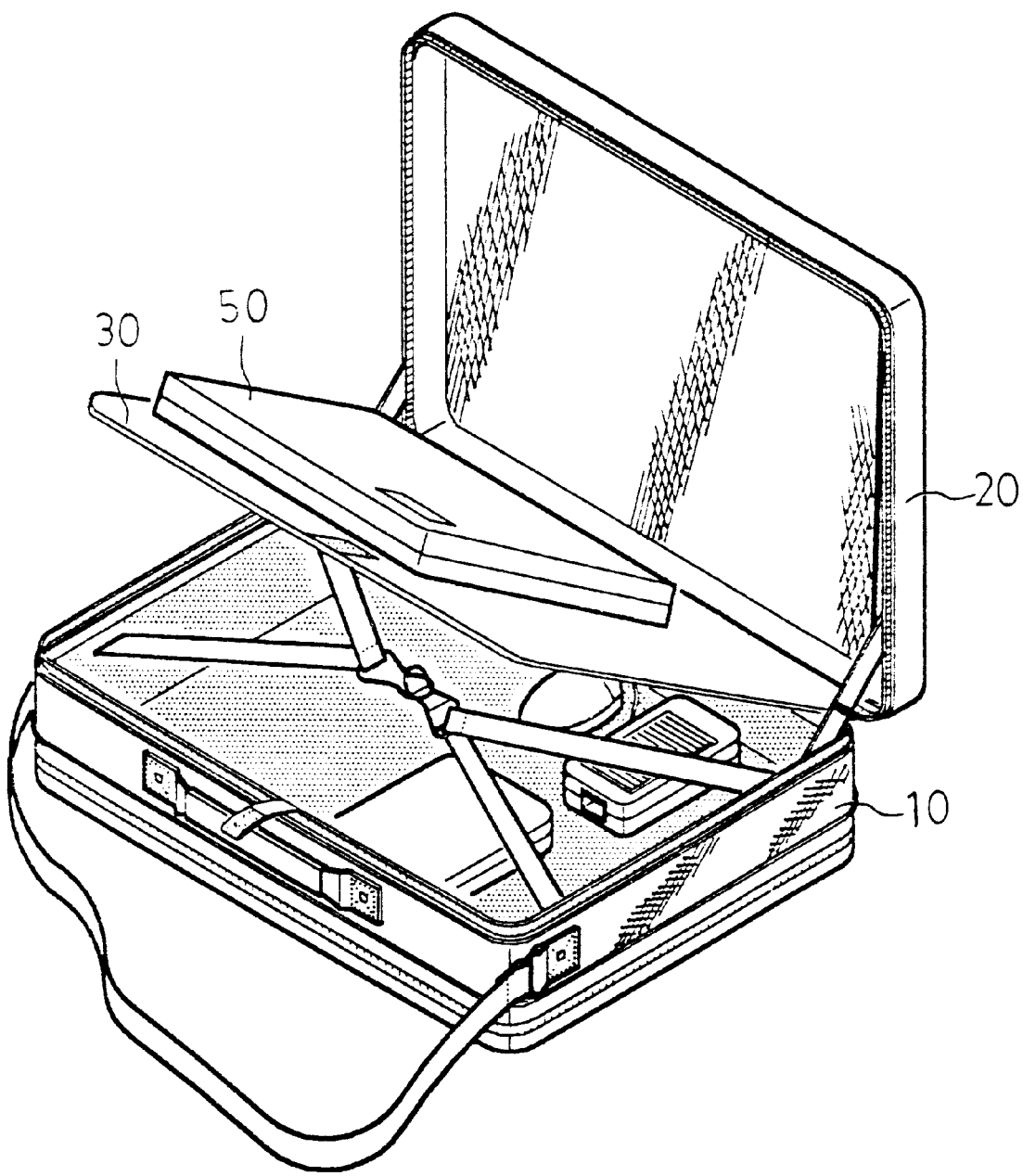
FIG. 7 is another working view of the present invention.

The rectangular case 10 is provided with a cover 20 connected with one side of the rectangular case 10 for closing the rectangular case 10 and protecting the articles therein from being damaged. The rectangular case 10 is formed with a recess 11 for receiving a notebook computer 50 and peripherals (shown but not numbered). Two opposite inner sides of recess 11 of the rectangular case 10 are provided with two straps 12, respectively. Each of the straps 12 has a connector 121 at the intermediate portion so that the straps 12 can be easily engaged to keep the notebook computer 50, mouse, modem and floppy disk container in place. The rectangular case 10 has a rigid frame 101 (see FIG. 3) around the inner vertical sides thereof. The rigid frame 101 is slightly lower than the upper edges of the rectangular case 10 so as to enable the notebook computer 50 to be operated without interfering with the edges of the rectangular case 50, as shown in FIGS. 6 and 7. Furthermore, the bottom of the rectangular case 10 and the rigid frame 101 are provided with cushions (shown but not numbered) for preventing the notebook computer 50 and the peripherals from being damaged in case the carrying bag collides with other objects inadvertently.

The other three sides of the cover 20 are sealably connected with the rectangular case 10 by a zipper (shown but not numbered) so that the carrying bag can be conveniently zipped open or shut as desired. Both the rectangular case 10 and the cover 20 are preferably made of flexible material such as soft cloth, synthetic leather or the like. The cover 20 has several pockets (shown but not numbered) at the inner side for receiving desired articles. A pair of supporting straps 40 (see FIGS. 3 and 3A) are connected between the rectangular case 10 and the cover 20 for keeping the cover 20 at an angle slightly larger than 90 degrees when opened. Each of the supporting straps 40 is provided with a seam 41 (see FIG. 3A) at the inner side so that when the cover 11 is closed, the supporting strap 40 will be automatically folded into the rectangular case 10 thus causing much convenience in use.

Figures 3, 3A:
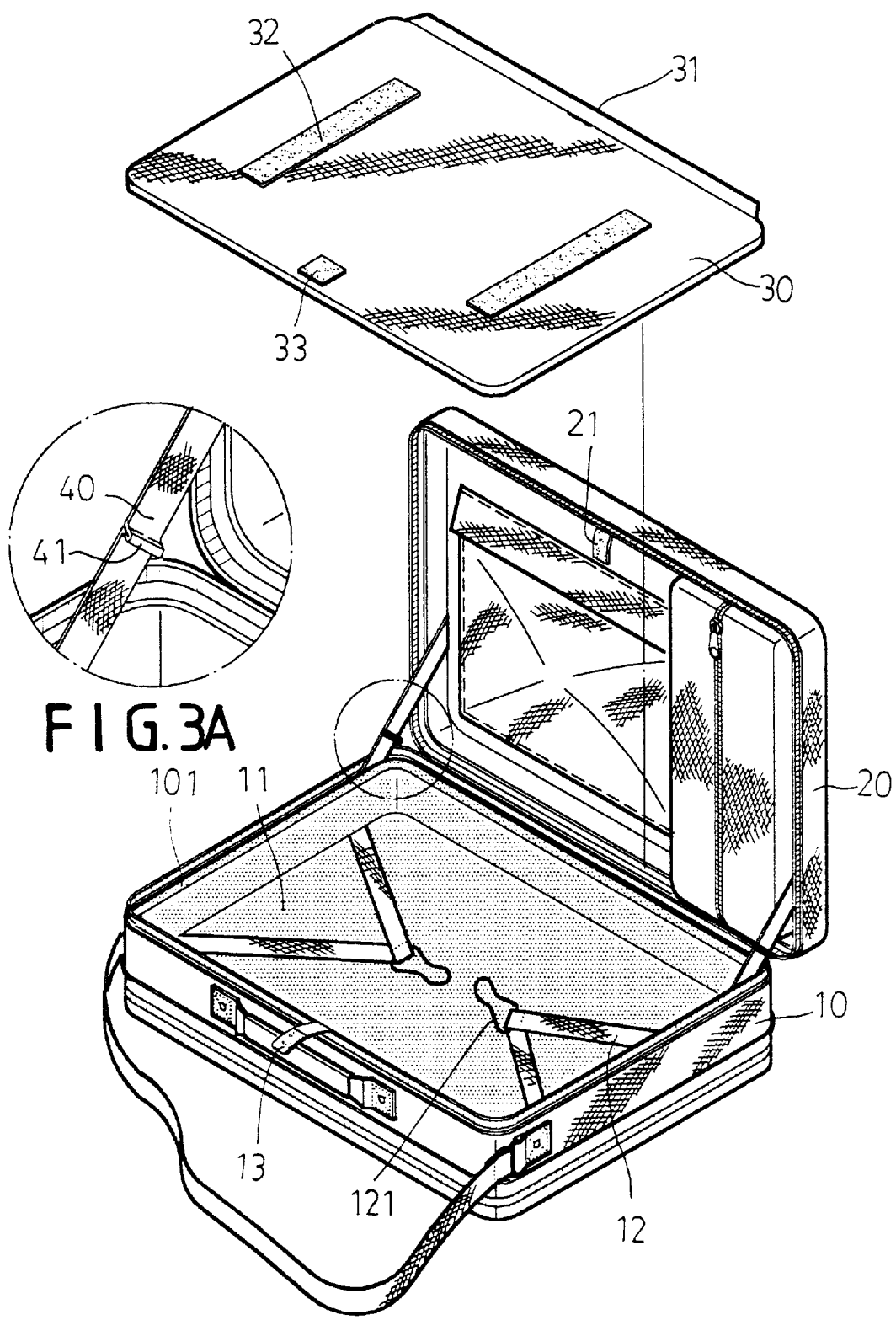
FIG. 3 is an exploded view of the present invention.
FIG. 3A is an enlarged fragmentary view of the present invention.
Figure 4:
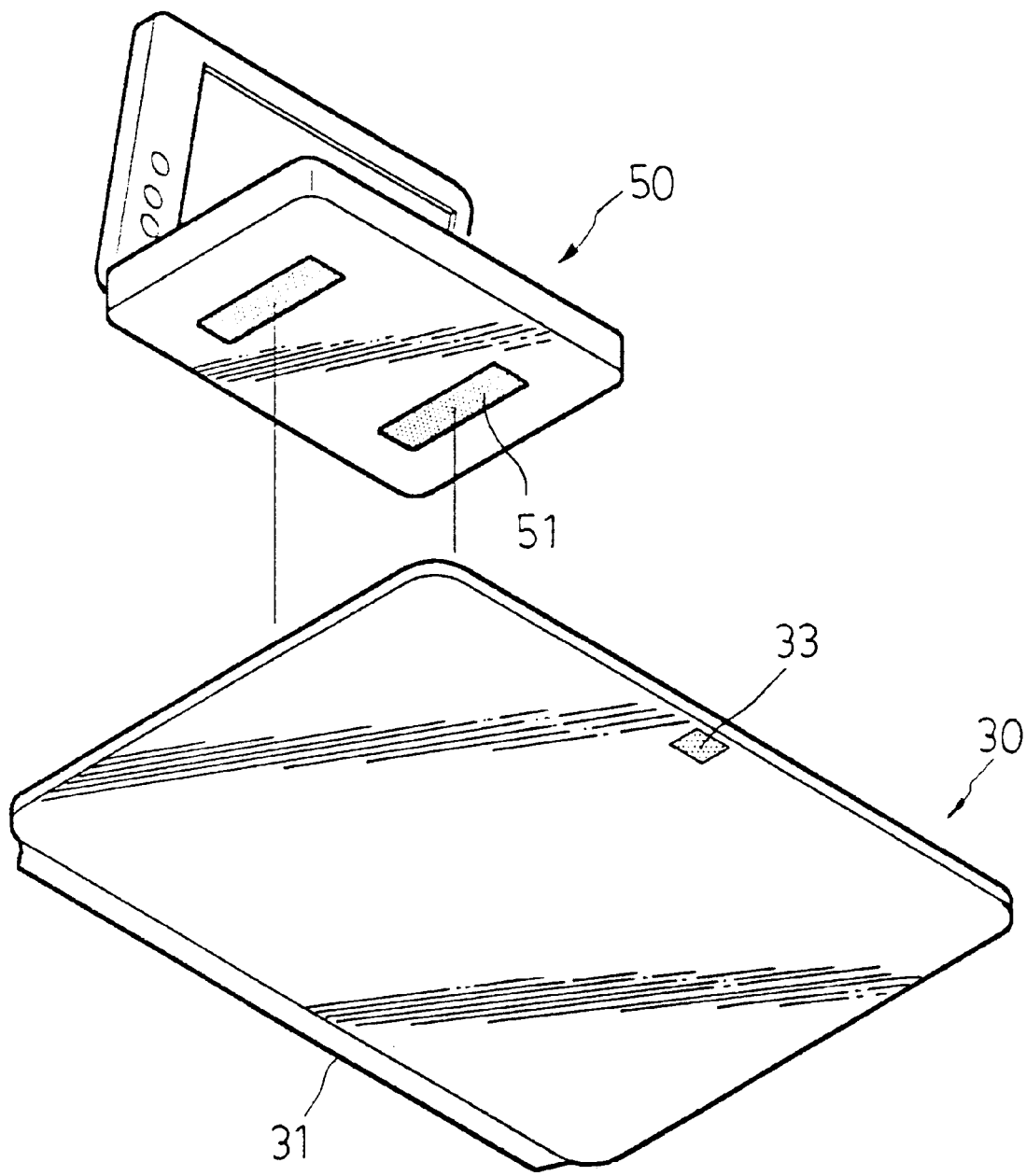
FIG. 4 illustrates how a notebook computer can be firmly kept on the rigid board.
Figure 5:
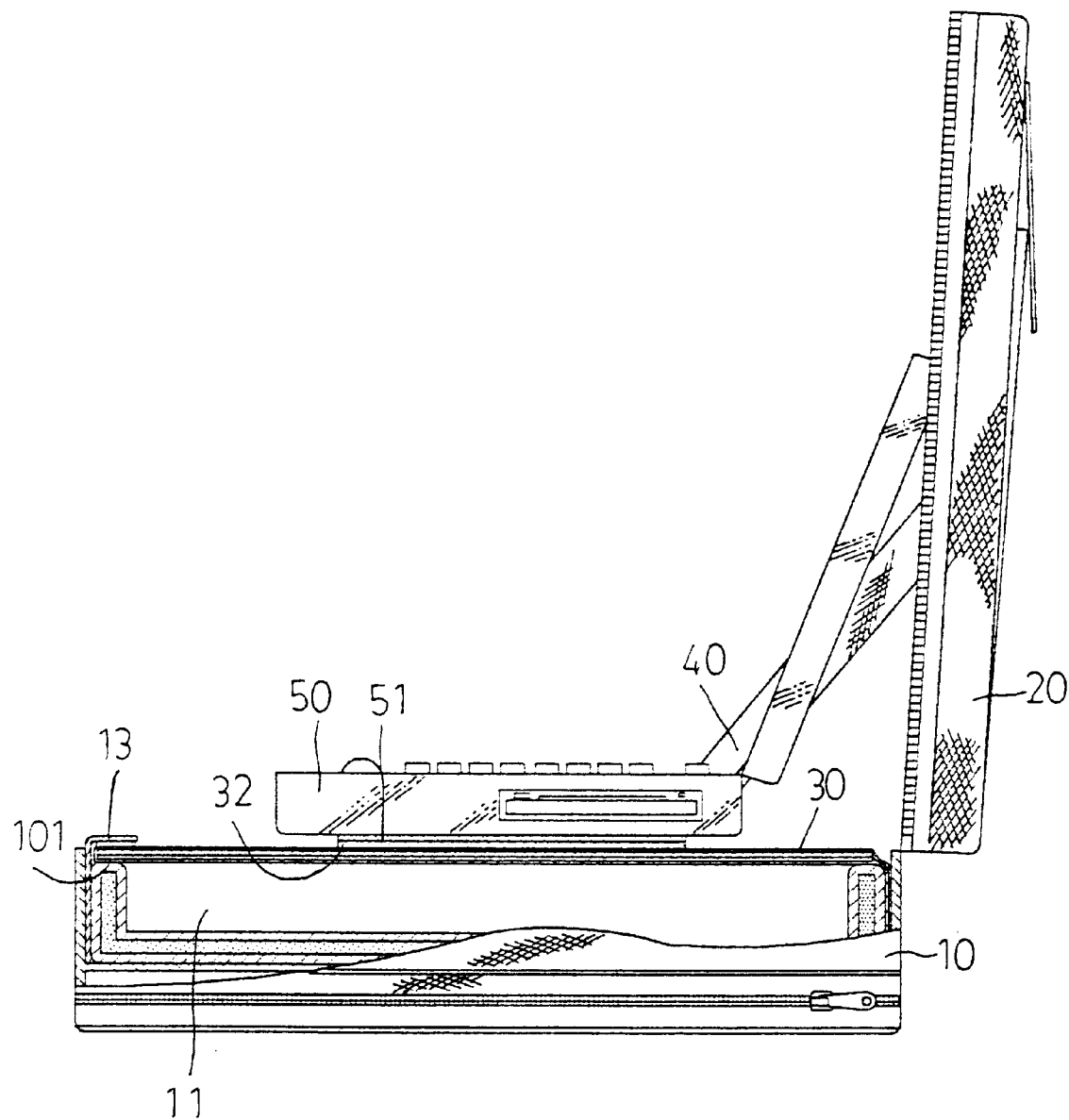
FIG. 5 is sectional view of the present invention.

The rigid board 30 has an inner edge 31 fixedly connected with a neck portion between the rectangular case 10 and the cover 20 and dimensioned to fit on the top of the rigid frame 101. As illustrated in FIG. 3, the rigid board 30 is provided with a hook-and-loop member 33 close to the outer edge thereof adapted for engaging with a matching hook-and-loop member 13 which is fastened in the front side of the rectangular case 10. Furthermore, the top of the rigid board 30 is provided with two parallel hook-and-loop members 32 engageable with matching hook-and-loop members 51 adhered to the bottom of the notebook computer 50 for preventing the notebook computer 50 from slipping down from the rigid board 30 so that a user may place the notebook computer 50 on his lap top for operation without worrying that it would slip off his lap top and fall down on the floor (see FIGS. 3, 4, 5, 6 and 7).

In use, the zipper is first zipped open and the notebook computer 50 is taken out of the rectangular case 10. Then, the rigid board 30 is lifted. Thereafter, the rigid board 30 is arranged on the rigid frame 101 of the rectangular case 10 to form a table top for supporting the notebook computer 50.

Figure 8:
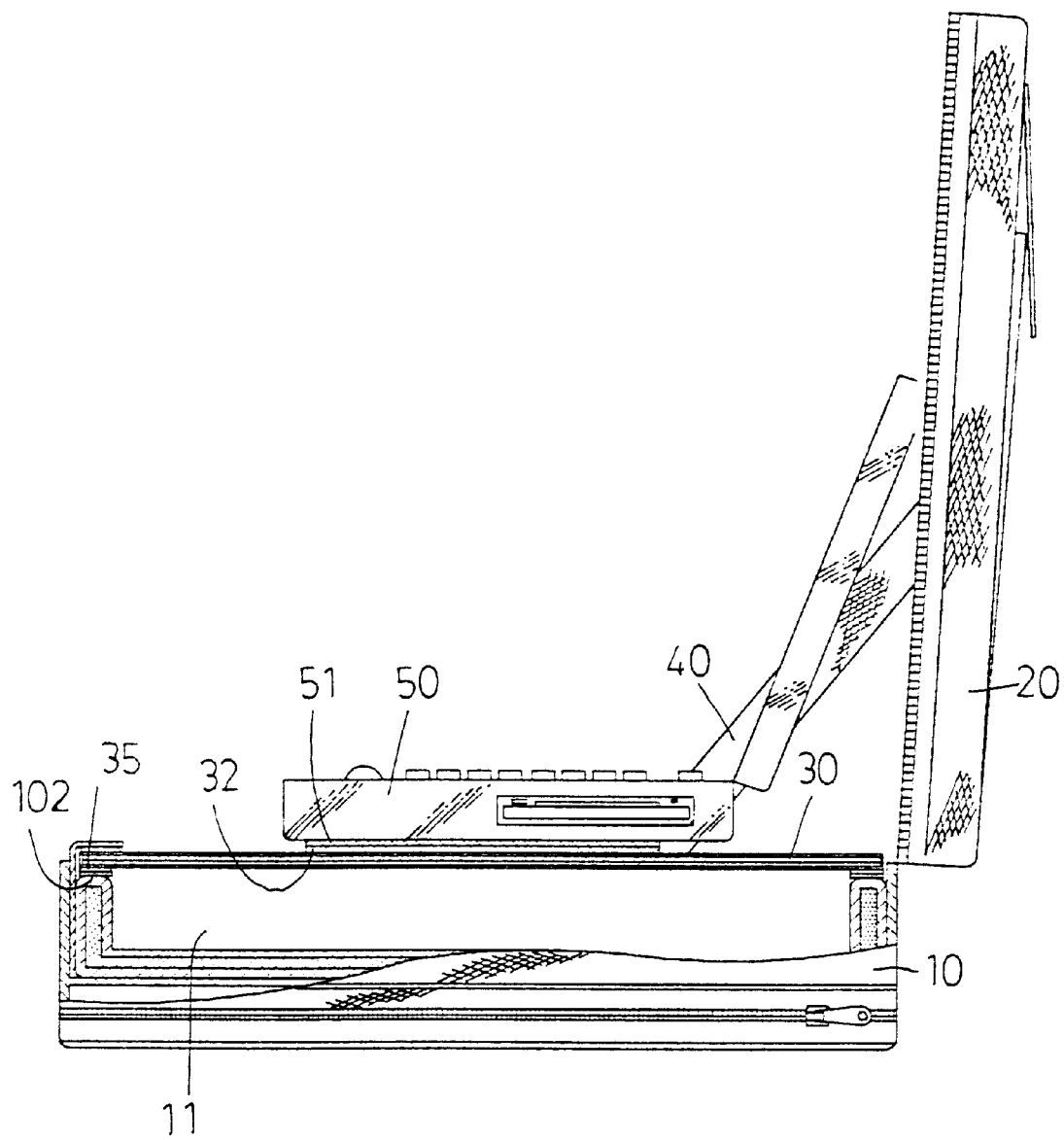
FIG. 8 illustrates another preferred embodiment of the present invention.

FIG. 8 illustrates another preferred embodiment of the present invention. As shown, the rigid board 30 is detachably connected with the neck portion between the rectangular case 10 and the cover 20 by hook-and-loop members.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A carrying bag for a notebook computer and peripherals comprising:

a rectangular case provided with a cover having one side connected with one side of said rectangular case and three sides sealably connected with said rectangular case by a zipper, said rectangular case having a rigid frame internal to walls of said rectangular case, said rigid frame being slightly lower than upper edges of said rectangular case;

a pair of supporting straps connected between said rectagular case and said cover, each of said supporting straps having an inner side provided with a seam at an intermediate portion thereof; and a rigid board dimensioned to fit on a top of said rigid frame.

2. The carrying bag for a notebook computer and peripherals as claimed in claim 1, wherein a bottom of said rectangular case and said rigid frame are covered with cushions.

3. The carrying bag for a notebook computer and peripherals as claimed in claim 1, wherein said rigid board has one side fixedly connected with a neck portion between said rectangular case and said cover.

4. The carrying bag for a notebook computer and peripherals as claimed in claim 1, wherein said rigid board has one side detachably connected with a neck portion between said rectangular case and said cover.

\* \* \* \* \*